United States Patent
Liu

(10) Patent No.: US 11,329,680 B2
(45) Date of Patent: May 10, 2022

(54) RECEIVING DEVICE AND METHOD FOR DYNAMICALLY ADJUSTING THE ATTENUATION OF THE RECEIVED SIGNAL

(71) Applicant: MOXA INC., New Taipei (TW)

(72) Inventor: Hsin Hung Liu, New Taipei (TW)

(73) Assignee: MOXA INC., New Taipei (TW)

( * ) Notice: Subject to any disclaimer, the term of this patent is extended or adjusted under 35 U.S.C. 154(b) by 16 days.

(21) Appl. No.: 17/146,880

(22) Filed: Jan. 12, 2021

(65) Prior Publication Data

US 2021/0367632 A1    Nov. 25, 2021

(30) Foreign Application Priority Data

May 22, 2020   (TW) .................................. 109117083

(51) Int. Cl.
    *H04B 1/10*     (2006.01)
(52) U.S. Cl.
    CPC ......... *H04B 1/1027* (2013.01); *H04B 1/1018* (2013.01); *H04B 2001/1045* (2013.01); *H04B 2001/1063* (2013.01)
(58) Field of Classification Search
    CPC ................ H04B 1/1027; H04B 1/1018; H04B 2001/1045; H04B 2001/1063;
    (Continued)

(56) References Cited

U.S. PATENT DOCUMENTS 6,026,285 A      2/2000  Lyall et al.
8,706,069 B2 *   4/2014  Khoini-Poorfard ..........
                                         H04L 27/148
                                             455/340
(Continued)

FOREIGN PATENT DOCUMENTS

AU    2011203222 A1 *  7/2011  ............. G01S 13/10
CN       108024277 A     5/2018
(Continued)

OTHER PUBLICATIONS

Extended European Search Report dated Nov. 5, 2021, issued in application No. EP 21155672.5.

(Continued)

*Primary Examiner* — Jean B Corrielus
(74) *Attorney, Agent, or Firm* — McClure, Qualey & Rodack, LLP

(57) ABSTRACT

A receiving device is provided. The receiving device includes an antenna device, a filter circuit, a transceiver, an adjustable attenuator, a circulator, and a processor. The antenna device receives a received signal. The filter circuit separates an in-band signal and an out-band signal from the received signal. The adjustable attenuator adjusts the attenuation value corresponding to the in-band signal and transmits the adjusted in-band signal to the transceiver. The circulator receives the received signal from the antenna device and transmits the received signal to the filter circuit, and the circulator receives a reflected signal from the filter circuit. The processor determines how to adjust the attenuation value corresponding to the in-band signal according to information related to the out-band signal and information related to the in-band signal that has been processed by the adjustable attenuator and the transceiver.

23 Claims, 7 Drawing Sheets

(58) Field of Classification Search
CPC ........ H04B 1/1036; H04B 1/109; H04B 1/38;
H04B 1/10
See application file for complete search history.

(56) References Cited

U.S. PATENT DOCUMENTS

| | | | |
|---|---|---|---|
| 8,837,637 B2* | 9/2014 | Tseng ...................... | H04L 27/22 |
| | | | 375/345 |
| 9,800,287 B2* | 10/2017 | Hwang .................. | H04B 1/525 |
| 10,033,343 B2 | 7/2018 | Tasic et al. | |
| 2007/0093224 A1* | 4/2007 | Lo ........................ | H04B 1/1027 |
| | | | 455/251.1 |
| 2008/0181337 A1* | 7/2008 | Maxim ............... | H03M 1/0614 |
| | | | 455/230 |
| 2016/0301379 A1 | 10/2016 | Ikada | |
| 2017/0019190 A1 | 1/2017 | Pack et al. | |

FOREIGN PATENT DOCUMENTS

| | | |
|---|---|---|
| GB | 2 307 829 A | 6/1997 |
| WO | 2010/014806 A1 | 2/2010 |
| WO | WO-2017008851 A * 1/2017 ........... H04B 1/1027 |

OTHER PUBLICATIONS

Chinese language office action dated Mar. 10, 2021, issued in application No. TW 109117083.
Extended European Search Report dated Jul. 28, 2021, issued in application No. EP 21155672.5.

* cited by examiner

RECEIVING DEVICE AND METHOD FOR DYNAMICALLY ADJUSTING THE ATTENUATION OF THE RECEIVED SIGNAL

CROSS REFERENCE TO RELATED APPLICATIONS

This application claims priority of TW Patent Application No. 109117083 filed on May 22, 2020, the entirety of which is incorporated by reference herein.

BACKGROUND OF THE INVENTION

Field of the Invention

The invention generally relates to technology for receiving devices, and more particularly, it relates to a receiving device technology in which the attenuation value of the in-band signal of the received signal is adjusted according to the information of the out-band signal of the received signal.

Description of the Related Art

Because of the progress in communication technology, the requirement of the bandwidth in the wireless communication is increasing gradually. In the traditional listen-before-talk wireless communication mechanism, in order to share spectrum resources, the receiving device may confirm whether there is any other user using the channel which the receiving device is using first, and then perform data transmission and reception. However, in the complicated communication environment, the frequency band that the receiving device is using may be affected by the signals in the adjacent frequency band (i.e. the signals in the adjacent frequency band may leak into the frequency band that the receiving device is using). As a result, communication may be interrupted.

Traditionally, a band-pass filter in the receiving device may be used to filter out the signals in the adjacent frequency band. However, the traditional scheme does not consider the signals leaking into the used frequency band from the adjacent frequency band. Therefore, the receiving device cannot determine whether there is any leaking signal in the used frequency band from the adjacent frequency band, and cannot determine the influence level of the leaking signals on the in-band signals. Therefore, the receiving device cannot perform the appropriate adjustment in response to the leaking signals from the adjacent frequency band for the in-band signals.

BRIEF SUMMARY OF THE INVENTION

A receiving device and a method for dynamically adjusting the attenuation value of a received signal are provided to overcome the aforementioned problems.

An embodiment of the invention provides a receiving device. The receiving device comprises an antenna device, a filter circuit, a transceiver, an adjustable attenuator, a circulator, and a processor. The antenna device is configured to receive a received signal. The filter circuit is configure to separate an in-band signal and an out-band signal from the received signal. The adjustable attenuator is configured to adjust the attenuation value corresponding to the in-band signal and transmit the adjusted in-band signal to the transceiver. The circulator is coupled to the antenna device and the filter circuit. The circulator receives the received signal from the antenna device and transmits the received signal to the filter circuit. The circulator receives a reflected signal from the filter circuit. The processor is coupled to the adjustable attenuator and the transceiver. The processor determines how to adjust the attenuation value corresponding to the in-band signal according to information related to the out-band signal and information related to the in-band signal that has been processed by the adjustable attenuator and the transceiver.

In some embodiments of the invention, the processor determines whether the signal level of the out-band signal is greater than a first threshold, and whether the signal quality of the in-band signal is greater than a second threshold.

In some embodiments of the invention, when the signal level of the out-band signal is greater than the first threshold and the signal quality of the in-band signal is greater than the second threshold, the processor commands the adjustable attenuator to increase the attenuation value.

In some embodiments of the invention, when the signal level of the out-band signal is greater than the first threshold and the signal quality of the in-band signal is not greater than the second threshold, the processor commands the adjustable attenuator to decrease the attenuation value, wherein if the attenuation value has been adjusted to a lower limit value, the processor commands the transceiver to transmit a request packet to a transmitting device to ask the transmitting device to adjust its transmission power.

In some embodiments of the invention, when the signal level of the out-band signal is not greater than the first threshold and the signal quality of the in-band signal is greater than the second threshold, the processor commands the adjustable attenuator to increase the attenuation value.

In some embodiments of the invention, when the signal level of the out-band signal is not greater than the first threshold and the signal quality of the in-band signal is not greater than the second threshold, the processor commands the adjustable attenuator to decrease the attenuation value, wherein if the attenuation value has been adjusted to a lower limit value, the processor commands the transceiver to transmit a request packet to a transmitting device to ask the transmitting device to adjust its transmission power.

In some embodiments of the invention, when the signal quality of the in-band signal is not greater than the second threshold, the processor commands the transceiver to transmit a request packet to a transmitting device to ask the transmitting device to adjust its transmission power.

In some embodiments of the invention, before the processor determines whether the signal level of the out-band signal is greater than the first threshold and whether the signal quality of the in-band signal is greater than the second threshold, the processor determines whether the packet error rate of the received signal is lower than a threshold.

An embodiment of the invention provides a method for dynamically adjusting the attenuation value of a received signal. The method for dynamically adjusting the attenuation value of the received signal is applied to a receiving device. The method for dynamically adjusting the attenuation value of the received signal comprises the following steps: a circulator of the receiving device is used to transmit a received signal to a filter circuit of the receiving device; the filter circuit is used to separate an in-band signal and an out-band signal from the received signal; the processor of the receiving device is used to determine how to adjust the attenuation value corresponding to the in-band signal according to information related to the out-band signal and information related to the in-band signal that has been processed by an adjustable attenuator and a transceiver of the receiving device.

Other aspects and features of the invention will become apparent to those with ordinary skill in the art upon review of the following descriptions of specific embodiments of receiving device and method for dynamically adjusting the attenuation value of a received signal.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
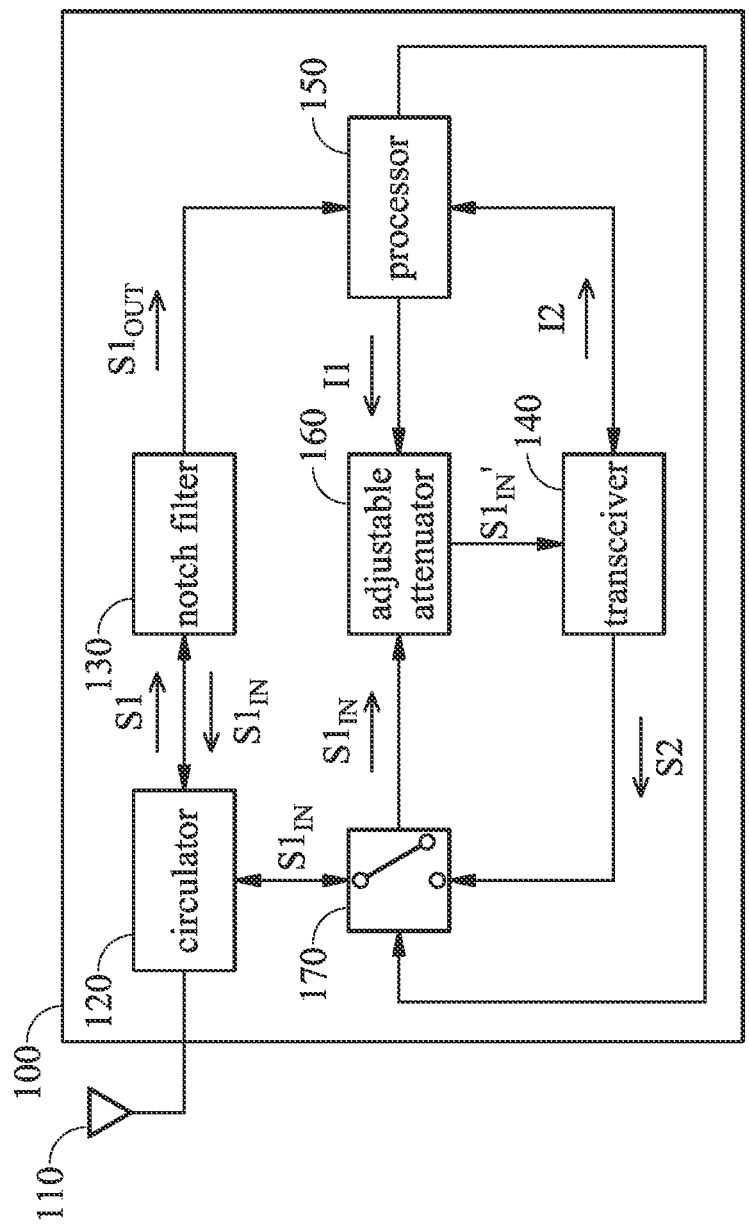
FIG. 1A is a block diagram of a receiving device 100 according to an embodiment of the invention.

FIG. 1A is a block diagram of a receiving device 100 according to an embodiment of the invention. As shown in FIG. 1A, the receiving device 100 comprises an antenna device 110, a circulator 120, notch filter (or band-stop filter) 130, a transceiver 140, a processor 150, an adjustable attenuator 160, and switch circuit 170. It should be noted that the block diagram shown in FIG. 1A is only used to illustrate the embodiments of the invention, but the invention should not be limited thereto. The receiving device 100 may comprise other elements. For example, the receiving device 100 may comprise a radio frequency (RF) signal processing circuit and a base band (BS) signal processing circuit. In additional, the circulator 120, notch filter 130, processor 150 and an adjustable attenuator 160 can be integrated into a chip or a communication module.

According to the embodiments of the invention, the receiving device 100 can be applied to the listen-before-talk wireless communication mechanism, such as Wi-Fi, and other wireless communication technologies. In addition, according to embodiments of the invention, the receiving device 100 may belong to and configured in an electronic device, e.g. smart phone, tablet, note book, and so on.

According to an embodiment of the invention, the antenna device 110 may comprise at least one antenna. The antenna device 110 may be configured to receive an external received signal S1, and transmit the received signal S1 to the circulator 120.

According to an embodiment of the invention, the circulator 120 may transmit the signal which comes in receiving direction (i.e. received signal S1) to the notch filter 130, and then transmit the reflected signal (i.e. the signal cannot pass through the notch filter 130) from the notch filter 130 to the transceiver 140. In addition, the circulator 120 may transmit the signal which comes in transmit direction (i.e. the signal from the transceiver 140) to the antenna device 110.

According to an embodiment of the invention, after the notch filter 130 receives the received signal S1, the notch filter 130 may reflect the signal in the frequency band which is being used by the receiving device 100 (i.e. the in-band signal $S1_{IN}$ in the received signal S1) to the circulator 120. That is to say, the notch filter 130 may merely let the signal outside the frequency band (e.g. the frequency band whose central frequency is 2.4 GHz, but the invention should not be limited thereto) which is being used by the receiving device 100 (i.e. the out-band signal $S1_{OUT}$ in the received signal S1) pass through the notch filter 130. The out-band signal $S1_{OUT}$ passing through the notch filter 130 may be transmitted to the processor 150. The in-band signal $S1_{IN}$ not passing through the notch filter 130 may be reflected to the circulator 120 and then, the circulator 120 transmits the in-band signal $S1_{IN}$ to the adjustable attenuator 160. Specifically, when there is a signal received in the receiving direction (e.g. in-band signal $S1_{IN}$), the processor 150 may tell the switch circuit 170 to form the conducting path between the circulator 120 and the adjustable attenuator 160, and when there is a signal received in the transmission direction (e.g. request packet S2), the processor 150 may order the switch circuit 170 to form the conducting path between the circulator 120 and the transceiver 140. Therefore, after the switch circuit 170 receives the in-band signal $S1_{IN}$, the processor 150 may order the switch circuit 170 to form the conducting path between the circulator 120 and the adjustable attenuator 160 to transmit the in-band signal $S1_{IN}$ to the adjustable attenuator 160. The adjustable attenuator 160 may determine whether to adjust the attenuation value corresponding to the in-band signal $S1_{IN}$ according to the indication I1 form the processor 150 to output the in-band signal $S1_{IN}'$. The adjustable attenuator 160 may transmit the in-band signal $S1_{IN}'$ to the transceiver 140. The transceiver 140 may process the in-band signal $S1_{IN}'$ to generate the information I2 related to the in-band signal $S1_{IN}'$. Then, the transceiver 140 may transmit the information I2 related to the in-band signal $S1_{IN}'$ to the processor 150. The processor 150 may determine whether the attenuation value corresponding to the in-band signal $S1_{IN}'$ which has been adjusted by the adjustable attenuator 160 needs to be adjusted again to generate new in-band signal $S1_{IN}'$. According to the embodiments of the invention, the information I2 related to the in-band signal $S1_{IN}'$ may comprise one or more of the signal-to noise ratio (SNR) of the in-band signal the signal level, and the signal quality of the in-band signal $S1_{IN}'$, but the invention should be limited thereto.

According to an embodiment of the invention, after the processor 150 receives the out-band signal $S1_{OUT}$, the processor 150 may obtain the information related to the out-band signal $S1_{OUT}$ (e.g. the signal level of the out-band signal $S1_{OUT}$, but the invention should not be limited thereto) according to the out-band signal $S1_{OUT}$. According to the information related to the out-band signal $S1_{OUT}$, the processor 150 may determine whether there are other signals in the adjacent frequency bands and determine the influence of these signals on the frequency band which is being used by the receiving device 100. If the processor 150 determines that no out-band signal $S1_{OUT}$ is received, it means that no signal is leaking into the frequency band which is being used by the receiving device 100, or it means that the signal level of the out-band signal $S1_{OUT}$ is too low (e.g. the signal level of the out-band signal $S1_{OUT}$ is lower than a threshold) to affect the in-band signal $S1_{IN}$ (i.e. in this case, the processor 150 may also determine that no signal is leaking into the frequency band which is being used by the receiving device 100).

According to an embodiment of the invention, the processor 150 may determine how to adjust the attenuation value corresponding to the in-band signal $S1_{IN}$ according to the information related to the out-band signal $S1_{OUT}$ and the in-band signal $S1_{IN}'$. The details about how to adjust the attenuation value corresponding to the in-band signal $S1_{IN}$ will be illustrated in following embodiments.

According to an embodiment of the invention, before the processor 150 determines how to adjust the attenuation value corresponding to the in-band signal $S1_{IN}$ according to the information related to the out-band signal $S1_{OUT}$ and the in-band signal the processor 150 may determine whether the packet error rate is lower than a threshold first. For example, if the threshold is 10%, the processor 150 may determine whether the packet error rate is lower than 10%. If the packet error rate is lower than the threshold (e.g. 10%), the processor 150 may maintain the attenuation value corresponding to the in-band signal $S1_{IN}$ without adjusting the attenuation value corresponding to the in-band signal $S1_{IN}$. If the packet error rate is not lower than the threshold (e.g. 10%), the processor 150 may determine how to adjust the attenuation value corresponding to the in-band signal $S1_{IN}$ according to the information related to the out-band signal $S1_{OUT}$ and the in-band signal $S1_{IN}$.

According to an embodiment of the invention, when the processor 150 determines how to adjust the attenuation value corresponding to the in-band signal $S1_{IN}$ according to the information related to the out-band signal $S1_{OUT}$ and the in-band signal $S1_{IN}$, the processor 150 may determine the signal level of the out-band signal $S1_{OUT}$ is greater than a first threshold and whether the signal quality of the in-band signal $S1_{IN}'$ is greater than a second threshold. For example, the processor 150 may determine whether the signal level of the out-band signal $S1_{OUT}$ is greater than 10 dBm and whether the SNR of the in-band signal $S1_{IN}'$ is greater than a certain second threshold (e.g. 10 dB), but the invention should not be limited thereto.

According to an embodiment of the invention, when the signal level of the out-band signal $S1_{OUT}$ is greater than the first threshold (e.g. the signal level of the out-band signal $S1_{OUT}$ is greater than 10 dBm) and the signal quality of the in-band signal $S1_{IN}'$ is greater than the second threshold (e.g. the SNR of the in-band signal $S1_{IN}'$ is greater than a certain second threshold), the processor 150 may command the adjustable attenuator 160 to increase the attenuation value corresponding to the in-band signal $S1_{IN}$ (e.g. increase 1 dB for the attenuation value corresponding to the in-band signal $S1_{IN}$ (e.g. the attenuation value is increased from 3 dB to 4 dB), but the invention should not be limited thereto). In the embodiment of the invention, when the processor 150 determines that the attenuation value corresponding to the in-band signal $S1_{IN}$ needs to be increased, the processor 150 may further determine whether the attenuation value corresponding to the in-band signal $S1_{IN}$ has adjusted to an upper limit (i.e. the attenuation value corresponding to the in-band signal $S1_{IN}$ cannot be increased anymore). If the attenuation value corresponding to the in-band signal $S1_{IN}$ has adjusted to the upper limit value, the processor 150 may activate a clear channel assessment (CCA) mechanism. If the attenuation value corresponding to the in-band signal $S1_{IN}$ has not adjusted to the upper limit value, the processor 150 may tell the adjustable attenuator 160 to increase the attenuation value corresponding to the in-band signal $S1_{IN}$ (e.g. increase 1 dB for the attenuation value corresponding to the in-band signal $S1_{IN}$, but the invention should not be limited thereto). In the embodiment, when the attenuation value corresponding to the in-band signal $S1_{IN}$ has been increased, the processor 150 may again determine whether the packet error rate is lower than the threshold to determine whether the attenuation value corresponding to the in-band signal $S1_{IN}$ needs to be adjusted again. It should be noted that the CCA mechanism is common communication technology, so the details will not be discussed in more detail herein.

According to an embodiment, when the signal level of the out-band signal $S1_{OUT}$ is greater than the first threshold (e.g. the signal level of the out-band signal $S1_{OUT}$ is greater than 10 dBm) and the signal quality of the in-band signal $S1_{IN}'$ is not greater than the second threshold (e.g. the SNR of the in-band signal $S1_{IN}'$ is not greater than a certain second threshold), the processor 150 may tell the adjustable attenuator 160 to decrease the attenuation value corresponding to the in-band signal $S1_{IN}$ (e.g. decrease 1 dB for the attenuation value corresponding to the in-band signal $S1_{IN}$, but the invention should not be limited thereto). In the embodiment, when the attenuation value corresponding to the in-band signal $S1_{IN}$ has been increased, the processor 150 may again determine whether the packet error rate is lower than the threshold to determine whether the attenuation value corresponding to the in-band signal $S1_{IN}$ needs to be adjusted again. In the embodiment, when the processor 150 determines that the attenuation value corresponding to the in-band signal $S1_{IN}$ needs to be decreased, the processor 150 may further determine whether the attenuation value corresponding to the in-band signal $S1_{IN}$ has been adjusted to a lower limit (i.e. the attenuation value corresponding to the in-band signal $S1_{IN}$ cannot be decreased anymore). If the attenuation value corresponding to the in-band signal $S1_{IN}$ has been adjusted to the lower limit value, the processor 150 may tell the transceiver 140 to send a request packet S2 to the transmitting device (not shown in figures) which transmits the received signal S1 to the receiving device 100 to ask the transmitting device that transmits the received signal S1 to the receiving device 100 to increase its transmission power. For example, the processor 150 may tell the transceiver 140 to send a request packet S2 to the transmitting device which transmits the received signal S1 to the receiving device 100 to ask the transmitting device to increase its transmission power by 1 dB, but the invention should not be limited thereto. In addition, if the processor 150 of the receiving device 100 knows that the transmission power of the transmitting device has reached the maximum value, the processor 150 may activate CCA mechanism. If the attenuation value corresponding to the in-band signal $S1_{IN}$ has not been adjusted to the lower limit value, the processor 150 may command the adjustable attenuator 160 to decrease the attenuation value corresponding to the in-band signal Starr (e.g. decrease 1 dB for the attenuation value corresponding to the in-band signal $S1_{IN}$, but the invention should not be limited thereto). In the embodiment, when the transmitting device has increased its transmission power, the processor 150 may again determine whether the packet error rate is lower than the threshold to determine whether to adjust the attenuation value corresponding to the in-band signal $S1_{IN}$ again.

According to an embodiment of the invention, when the signal level of the out-band signal $S1_{OUT}$ is not greater than the first threshold (e.g. the signal level of the out-band signal $S1_{OUT}$ is not greater than 10 dBm) and the signal quality of the in-band signal $S1_{IN}$ is greater than the second threshold (e.g. the SNR of the in-band signal $S1_{IN}'$ is greater than a certain second threshold, i.e. in a high SNR state), the processor 150 may order the adjustable attenuator 160 to increase the attenuation value corresponding to the in-band signal $S1_{IN}$ (e.g. increase 1 dB for the attenuation value corresponding to the in-band signal $S1_{IN}$ (e.g. the attenuation value is increased from 3 dB to 4 dB), but the invention should not be limited thereto). In addition, in the embodiment, because the signal level of the out-band signal $S1_{OUT}$ is not greater than the first threshold, the processor 150 cannot definitely determine whether the noise of the in-band signal $S1_{IN}$ is from other signals in the frequency band which is being used by the receiving device 100 or from the out-band signal leaking into the frequency band which is being used by the receiving device 100. Therefore, in the embodiment of the invention, the processor 150 may further determines whether the noise floor is higher that a threshold (e.g. 5 dB). If the noise floor is higher that the threshold (e.g. the noise floor is higher than 5 dB), the processor 150 may further determine whether the attenuation value corresponding to the in-band signal $S1_{IN}$ has adjusted to an upper limit (i.e. the attenuation value corresponding to the in-band signal $S1_{IN}$ cannot be increased anymore). If the attenuation value corresponding to the in-band signal $S1_{IN}$ has adjusted to the upper limit value, the processor 150 may activate the CCA mechanism. If the attenuation value corresponding to the in-band signal $S1_{IN}$ has not adjusted to the upper limit value, the processor 150 may tell the adjustable attenuator 160 to increase the attenuation value corresponding to the in-band signal $S1_{IN}$ (e.g. increase 1 dB for the attenuation value corresponding to the in-band signal $S1_{IN}$ (e.g. the attenuation value is increased from 3 dB to 4 dB), but the invention should not be limited thereto). If the noise floor is not higher that the threshold (e.g. the noise floor is not higher than 5 dB), the processor 150 may activate the CCA mechanism directly. In the embodiment, when the attenuation value corresponding to the in-band signal $S1_{IN}$ has been increased, the processor 150 may again determine whether the packet error rate is lower than the threshold to determine whether the attenuation value corresponding to the in-band signal $S1_{IN}$ needs to be adjusted again. It should be noted that, because the in-band signal $S1_{IN}'$ is in the high SNR state in the embodiment, even the signal level of the noise is high (i.e. the noise floor is higher that the threshold), but the signal level of the noise is still much lower than the signal level in-band signal $S1_{IN}'$. Therefore, in the embodiment, the attenuation value corresponding to the in-band signal $S1_{IN}$ can be adjusted to decrease the noise.

According to an embodiment of the invention, when the signal level of the out-band signal $S1_{OUT}$ is not greater than the first threshold (e.g. the signal level of the out-band signal $S1_{OUT}$ is not greater than 10 dBm) and the signal quality of the in-band signal $S1_{IN}'$ is not greater than the second threshold (e.g. the SNR of the in-band signal $S1_{IN}'$ is not greater than a certain second threshold), the processor 150 may tell the adjustable attenuator 160 to decrease the attenuation value corresponding to the in-band signal $S1_{IN}$ (e.g. decrease 1 dB for the attenuation value corresponding to the in-band signal $S1_{IN}$, but the invention should not be limited thereto). In the embodiment, the processor 150 may determine whether the attenuation value corresponding to the in-band signal $S1_{IN}$ has been adjusted to a lower limit (i.e. the attenuation value corresponding to the in-band signal $S1_{IN}$ cannot be decreased anymore). If the attenuation value corresponding to the in-band signal $S1_{IN}$ has been adjusted to the lower limit value, the processor 150 may command the transceiver 140 to send a request packet S2 to the transmitting device (not shown in figures) which transmits the received signal S1 to the receiving device 100 to ask the transmitting device that transmits the received signal S1 to the receiving device 100 to increase its transmission power. For example, the processor 150 may tell the transceiver 140 to send the request packet S2 to the transmitting device which transmits the received signal S1 to the receiving device 100 to ask the transmitting device to increase its transmission power by 1 dB, but the invention should not be limited thereto. In addition, in the embodiment, because the signal level of the out-band signal $S1_{OUT}$ is not greater than the first threshold, the processor 150 cannot definitely determine whether the noise of the in-band signal $S1_{IN}$ is from other signals in the frequency band which is being used by the receiving device 100 or from the out-band signal leaking into the frequency band which is being used by the receiving device 100. Therefore, in the embodiment of the invention, the processor 150 may further determine whether the noise floor is higher that a threshold (e.g. 5 dB). If the noise floor is higher that the threshold (e.g. the noise floor is higher than 5 dB), the processor 150 may activate the CCA mechanism. If the noise floor is not higher that the threshold (e.g. the noise floor is not higher than 5 dB), the processor 150 may determine that the signal level of the in-band signal $S1_{IN}$ is too small, and therefore, the processor 150 may not adjust the attenuation value corresponding to the in-band signal $S1_{IN}$. It should be noted that because in the embodiment, the in-band signal $S1_{IN}'$ is in the low SNR state (i.e. the signal level of the noise is almost equivalent to the signal level of the in-band signal $S1_{IN}'$), and therefore, if the noise floor is not higher that the threshold (the signal level of the noise is small), it means that the low SNR of the in-band signal $S1_{IN}$ is occurred because the signal level of the in-band signal $S1_{IN}$ is too small, not because of the noise. If the attenuation value corresponding to the in-band signal $S1_{IN}$ has not been adjusted to the lower limit value, the processor 150 may order the adjustable attenuator 160 to decrease the attenuation value corresponding to the in-band signal $S1_{IN}$ (e.g. decrease 1 dB for the attenuation value corresponding to the in-band signal $S1_{IN}$, but the invention should not be limited thereto). In the embodiment, when the transmitting device increase its transmission power or the attenuation value corresponding to the in-band signal $S1_{IN}$ is decreased, the processor 150 may again determine whether the packet error rate is lower than the threshold to determine whether to adjust the attenuation value corresponding to the in-band signal $S1_{IN}$ again.

According to an embodiment of the invention, when the signal quality of the in-band signal $S1_{IN}'$ is not greater than the second threshold (e.g. the SNR of the in-band signal $S1_{IN}'$ is not greater than a certain second threshold), the processor 150 may directly command the transceiver 140 to send a request packet S2 to the transmitting device (not shown in figures) which transmits the received signal S1 to the receiving device 100, to ask the transmitting device that transmits the received signal S1 to the receiving device 100 to increase its transmission power. For example, the processor 150 may order the transceiver 140 to send the request packet S2 to the transmitting device which transmits the received signal S1 to the receiving device 100 to ask the transmitting device to increase its transmission power by 1 dB, but the invention should not be limited thereto. That is to say, in the embodiment, when the signal quality of the in-band signal $S1_{IN}'$ is too bad, the processor 150 may directly order the transceiver 140 to send the request packet S2 to the transmitting device. In addition, in the embodiment, if the processor 150 of the receiving device 100 knows that the transmission power of the transmitting device has reached the maximum value, the processor 150 may activate a CCA mechanism.

Figure 1B:
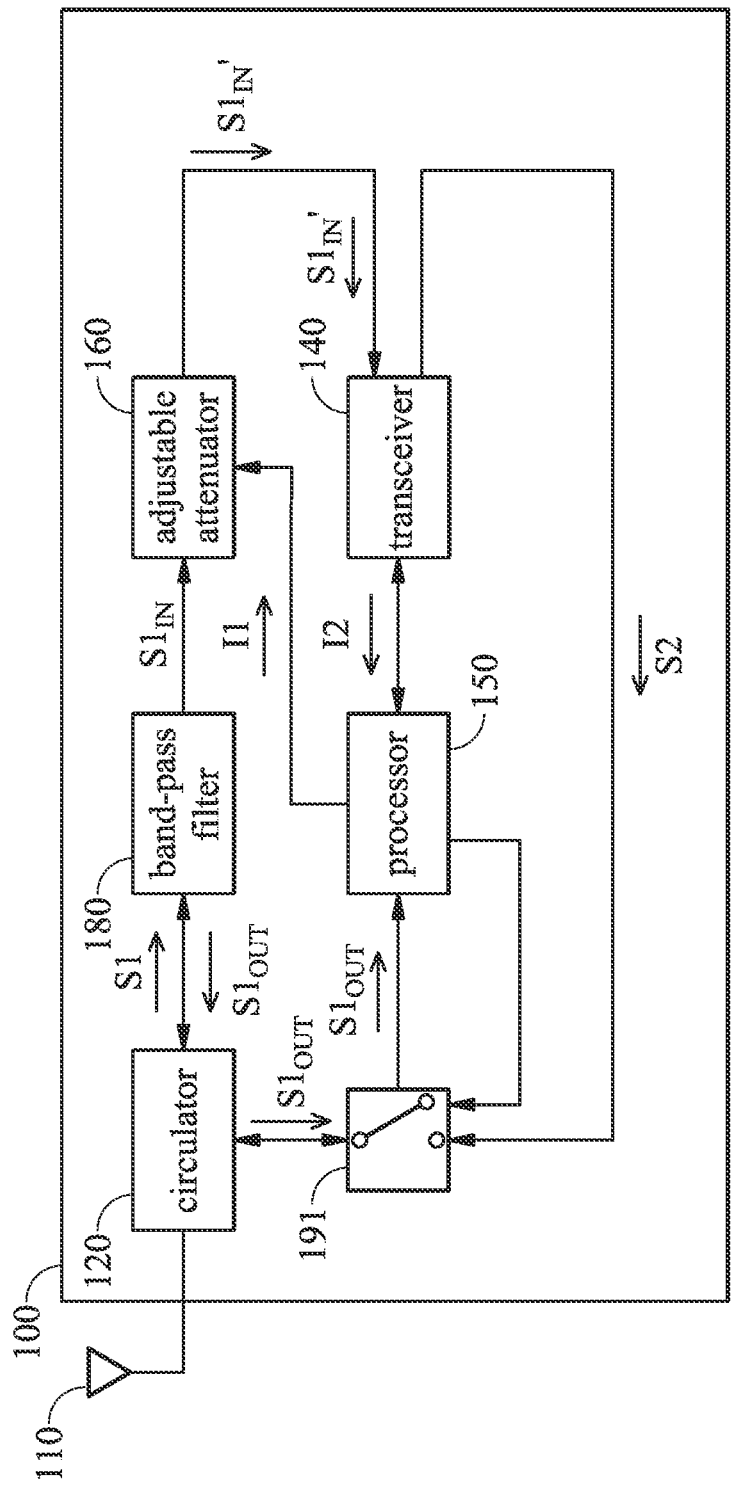
FIG. 1B is a block diagram of a receiving device 100 according to another embodiment of the invention.

FIG. 1B is a block diagram of a receiving device 100 according to another embodiment of the invention. As shown in FIG. 1B, the receiving device 100 comprises an antenna device 110, a circulator 120, a band-pass filter 180, a transceiver 140, a processor 150, an adjustable attenuator 160 and a first switch circuit 191. It should be noted that the block diagram shown in FIG. 1B is only used to illustrate the embodiments of the invention, but the invention should not be limited thereto. The receiving device 100 may comprise other elements. For example, the receiving device 100 may comprise a radio frequency (RF) signal processing circuit and a base band (BS) signal processing circuit.

The difference between FIG. 1A and FIG. 1B is that the band-pass filter 180 is adopted to separate the received signal S1 in the receiving device 100 of FIG. 1B.

As shown in FIG. 1B, according to an embodiment of the invention, when the band-pass filter 180 receives the received signal S1, the band-pass filter 180 may reflect the signal which is not in the frequency band which is being used by the receiving device 100 (i.e. the out-band signal $S1_{OUT}$ in the received signal S1) to the circulator 120. That is to say, the band-pass filter 180 may merely let the signal in the frequency band (e.g. the frequency band whose central frequency is 2.4 GHz, but the invention should not be limited thereto) which is being used by the receiving device 100 (i.e. the in-band signal $S1_{IN}$ in the received signal S1) pass through the band-pass filter 180.

The in-band signal $S1_{IN}$ passing through the band-pass filter 180 may transmit to the adjustable attenuator 160. The adjustable attenuator 160 may determine whether to adjust the attenuation value corresponding to the in-band signal $S1_{IN}$ according to the indication I1 form the processor 150 to output the in-band signal $S1_{IN}'$. The adjustable attenuator 160 may transmit the in-band signal to the transceiver 140. The transceiver 140 may process the in-band signal to generate the information I2 related to the in-band signal $S1_{IN}'$. Then, the transceiver 140 may transmit the information I2 related to the in-band signal to the processor 150.

The out-band signal $S1_{OUT}$ not passing through the band-pass filter 180 may be reflected to the circulator 120. Then, the circulator 120 may transmit the out-band signal $S1_{OUT}$ to the processor 150. Specifically, when there is a signal received in the receiving direction (e.g. out-band signal $S1_{OUT}$), the processor 150 may tell the first switch circuit 191 to form the conducting path between the circulator 120 and the processor 150, and when there is a signal received in the transmission direction (e.g. request packet S2), the processor 150 may tell the first switch circuit 191 to form the conducting path between the circulator 120 and the transceiver 140. Therefore, after the first switch circuit 191 receives the out-band signal $S1_{OUT}$, the processor 150 may order the first switch circuit 191 to form the conducting path between the circulator 120 and the processor 150 to transmit the out-band signal $S1_{OUT}$ to the processor 150.

Other operations of the receiving device 100 of FIG. 1B are similar to the receiving device 100 of FIG. 1A, therefore, details will not be repeated again.

In FIG. 1A and FIG. 1B, the notch filter 130 and the band-pass filter 180 are respectively adopted in the receiving device 100, but the invention should not be limited thereto. Any equivalent circuit of the notch filter 130 and the band-pass filter 180 also can be adopted. Furthermore, other circuits which may be configured to separate the received signal S1 also can be adopted.

Figure 2:
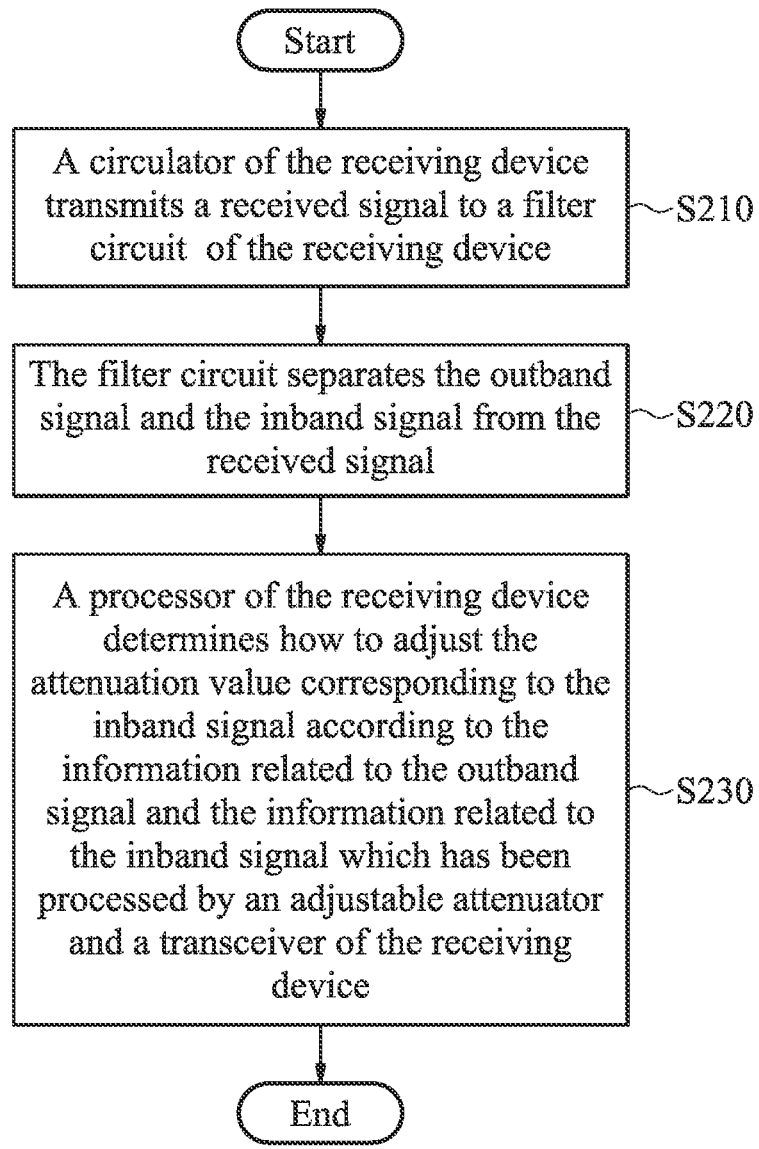
FIG. 2 is a flow chart illustrating a method for dynamically adjusting the attenuation value of the received signal according to an embodiment of the invention.

FIG. 2 is a flow chart illustrating a method for dynamically adjusting the attenuation value of the received signal according to an embodiment of the invention. The method for dynamically adjusting the attenuation value of the received signal can be applied to the receiving device 100.

As shown in FIG. 2, in step S210, a circulator of the receiving device 100 transmits a received signal to a filter circuit (the notch filter 130 or the band-pass filter 180) of the receiving device 100. In step S220, the filter circuit of the receiving device 100 separates the out-band signal and the in-band signal from the received signal. In step S230, a processor of the receiving device 100 determines how to adjust the attenuation value corresponding to the in-band signal according to the information related to the out-band signal and the information related to the in-band signal which has been processed by an adjustable attenuator and a transceiver of the receiving device 100.

In some embodiments of the invention, in the method for dynamically adjusting the attenuation value of the received signal, an adjustable attenuator of the receiving device 100 is configured to adjust the attenuation value corresponding to the in-band signal.

In some embodiments of the invention, in step S230, the processor of the receiving device 100 may determine the signal level of the out-band signal is greater than a first threshold and determine the signal quality of the in-band signal is greater than a second threshold to determine how to adjust the attenuation value corresponding to the in-band signal.

In some embodiments of the invention, before step S230, the processor of the receiving device 100 may determine whether the packet error rate of the received signal is lower than a threshold. If the packet error rate of the received signal is lower than the threshold, the processor of the receiving device 100 may maintain the attenuation value corresponding to the in-band signal without adjusting the attenuation value corresponding to the in-band signal. If the packet error rate of the received signal is not lower than the threshold, the processor of the receiving device 100 may determine how to adjust the attenuation value corresponding to the in-band signal according to the information of out-band signal and in-band signal. Details will be illustrated through FIGS. 3A-3B and FIGS. 4A-4B, but the invention should not be limited thereto.

Figure 3A:
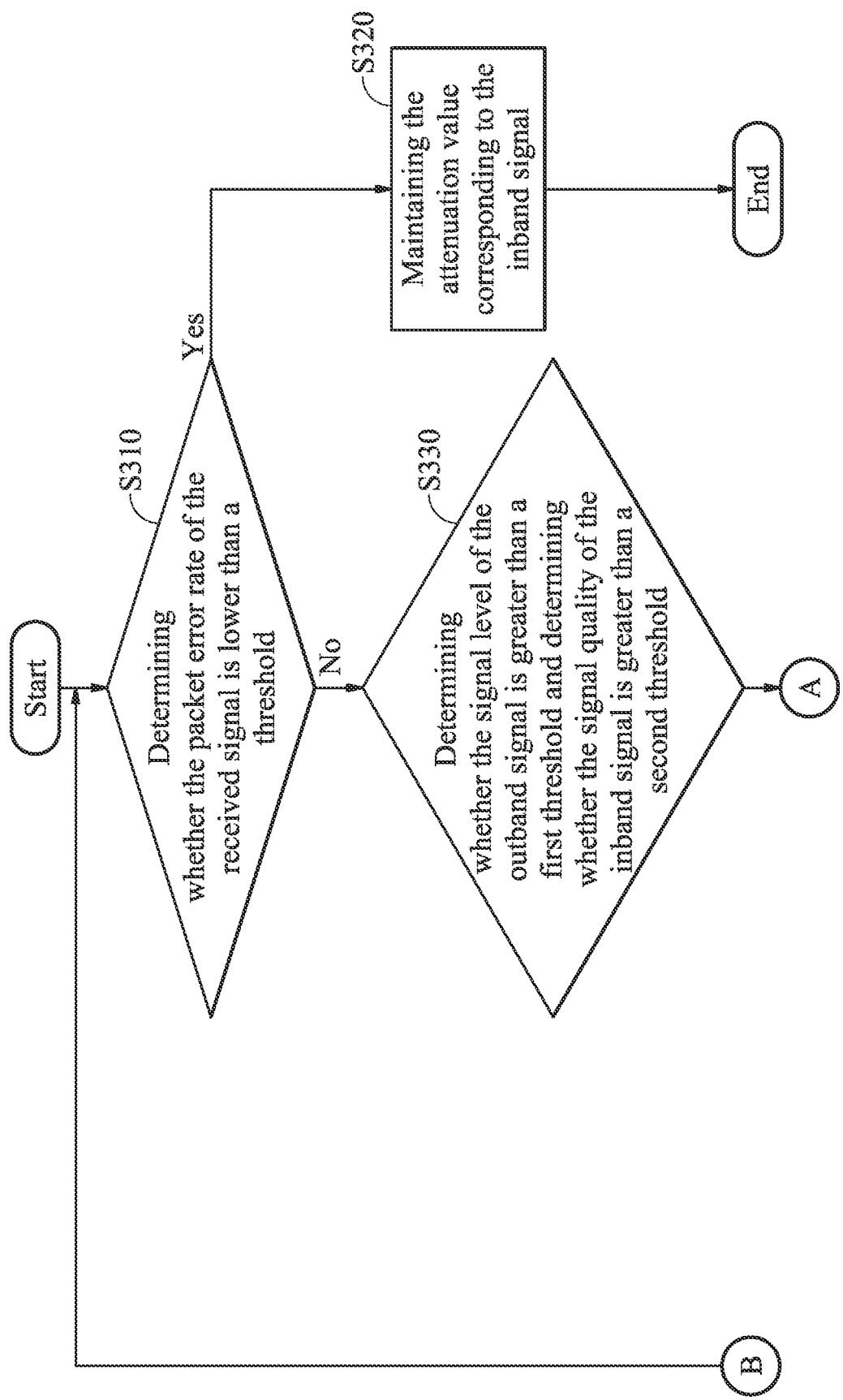
FIG. 3A-3B is a flow chart illustrating step S320 according to an embodiment of the invention.
Figure 3B:
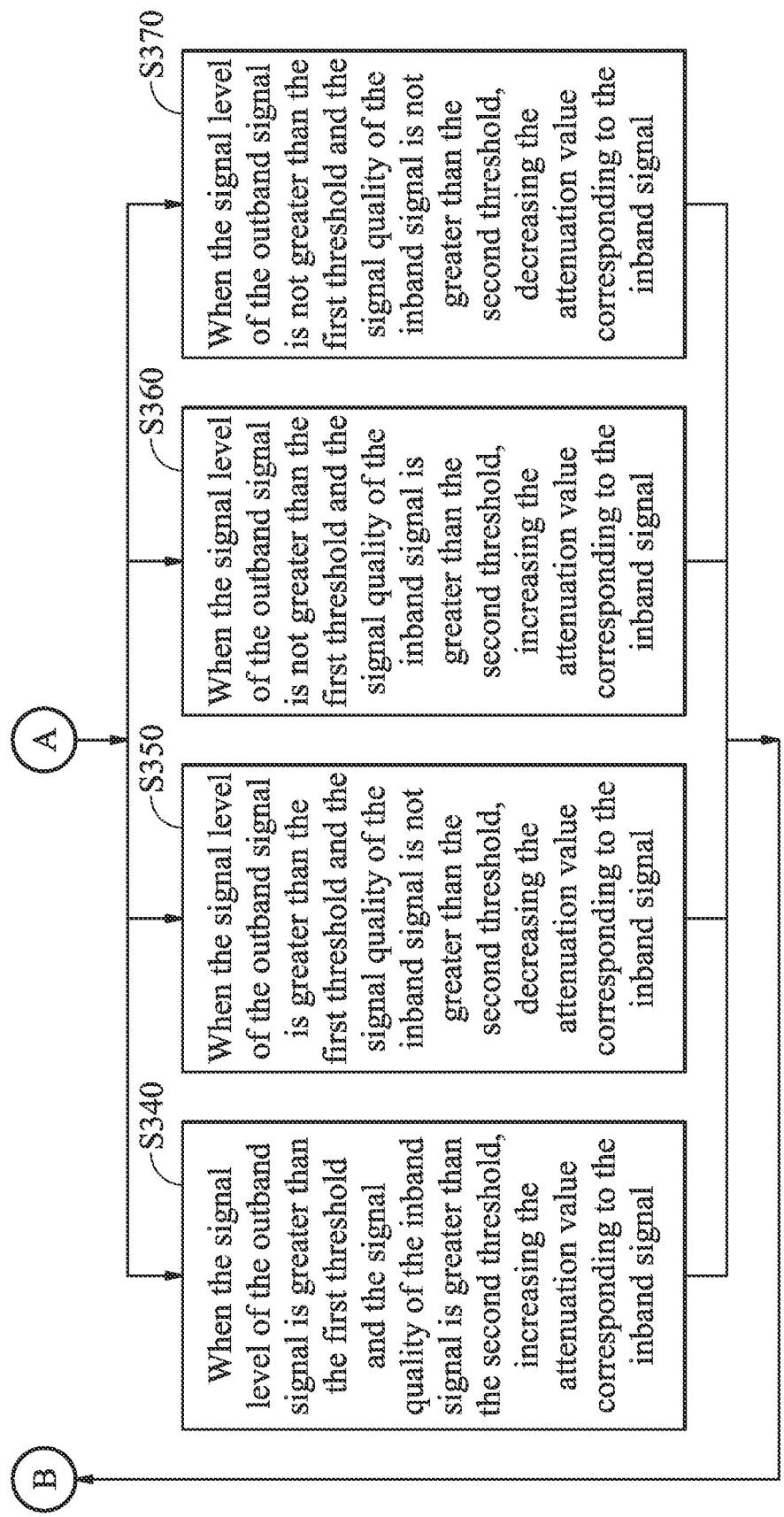

FIGS. 3A-3B is a flow chart illustrating step S320 according to an embodiment of the invention. The method shown in FIGS. 3A-3B can be applied to the receiving device 100. As shown in FIGS. 3A-3B, in step S310, the processor of the receiving device 100 may determine whether the packet error rate of the received signal is lower than a threshold. If the packet error rate of the received signal is lower than the threshold, step S320 is performed.

In step S320, the processor of the receiving device 100 may maintain the attenuation value corresponding to the in-band signal without adjusting the attenuation value corresponding to the in-band signal. If the packet error rate of the received signal is not lower than the threshold, step S330 is performed.

In step S330, the processor of the receiving device 100 may determine whether the signal level of the out-band signal is greater than a first threshold and determine whether the signal quality of the in-band signal is greater than a second threshold.

In step S340, when the signal level of the out-band signal is greater than the first threshold and the signal quality of the in-band signal is greater than the second threshold, the processor of the receiving device 100 may tell the adjustable attenuator to increase the attenuation value corresponding to the in-band signal. In an embodiment of the invention, in step S340, if the attenuation value corresponding to the in-band signal has been adjusted to the upper limit value, the processor of the receiving device 100 may activate a clear channel assessment (CCA) mechanism.

In step S350, when the signal level of the out-band signal is greater than the first threshold and the signal quality of the in-band signal is not greater than the second threshold, the processor of the receiving device 100 may order the adjustable attenuator to decrease the attenuation value corresponding to the in-band signal. In an embodiment of the invention, in step S350, if the attenuation value corresponding to the in-band signal has been adjusted to the lower limit value, the processor of the receiving device 100 may tell the transceiver of the receiving device 100 to transmit a request packet to the transmitting device that transmits the received signal to the receiving device to ask the transmitting device to adjust its transmission power.

In step S360, when the signal level of the out-band signal is not greater than the first threshold and the signal quality of the in-band signal is greater than the second threshold, the processor of the receiving device 100 may command the adjustable attenuator to increase the attenuation value corresponding to the in-band signal.

In step S370, when the signal level of the out-band signal is not greater than the first threshold and the signal quality of the in-band signal is not greater than the second threshold, the processor of the receiving device 100 may tell the adjustable attenuator to decrease the attenuation value corresponding to the in-band signal. In an embodiment of the invention, in step S370, if the attenuation value corresponding to the in-band signal has been adjusted to the lower limit value, the processor of the receiving device 100 may order the transceiver of the receiving device 100 to transmit a request packet to the transmitting device which transmits the received signal to the receiving device to ask the transmitting device to adjust its transmission power.

In the embodiment of FIG. 3A-3B, when the attenuation value corresponding to the in-band signal has been increased or decreased, the flow will back to step S310.

Figure 4A:
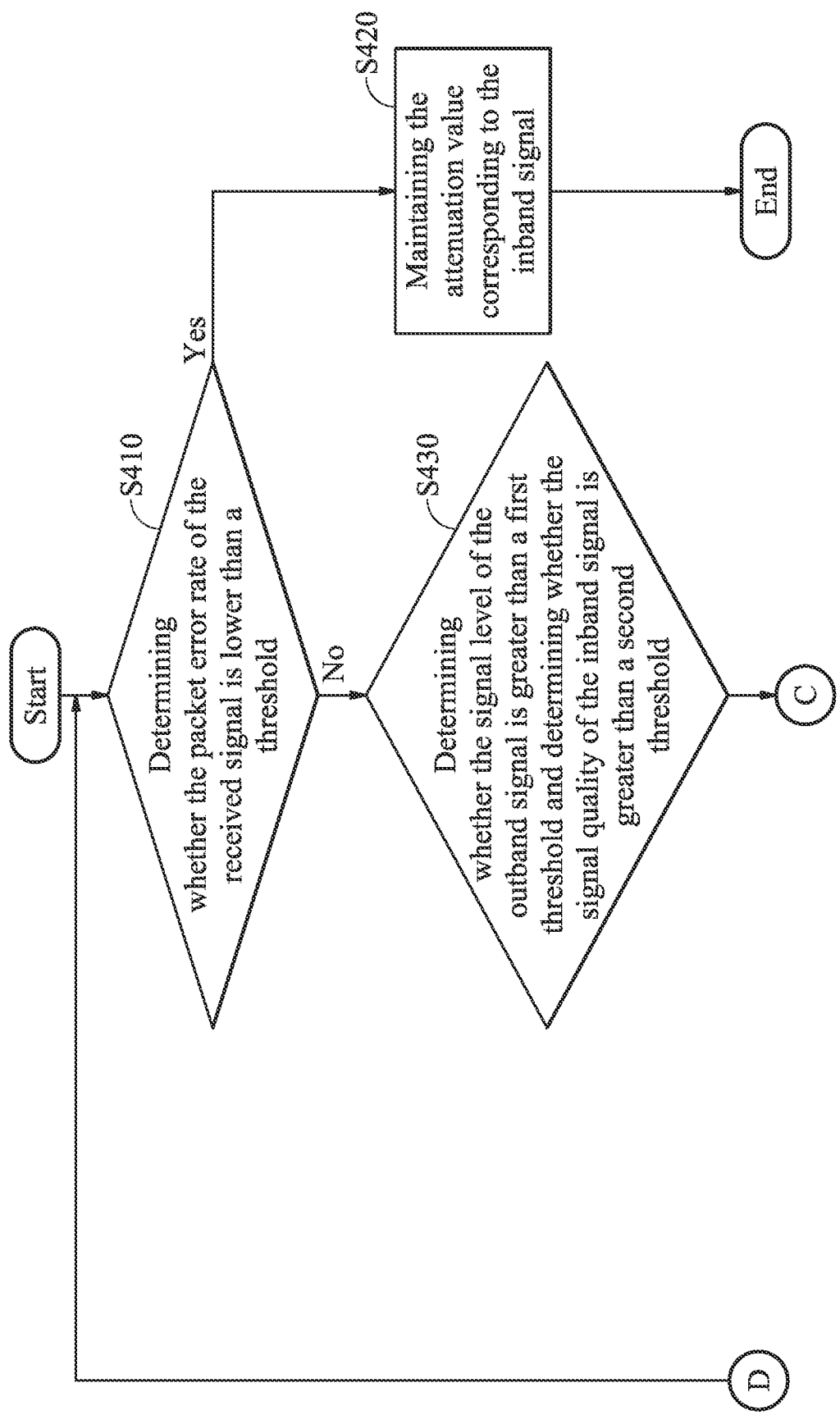
FIG. 4A-4B is a flow chart illustrating step S320 according to another embodiment of the invention.
Figure 4B:
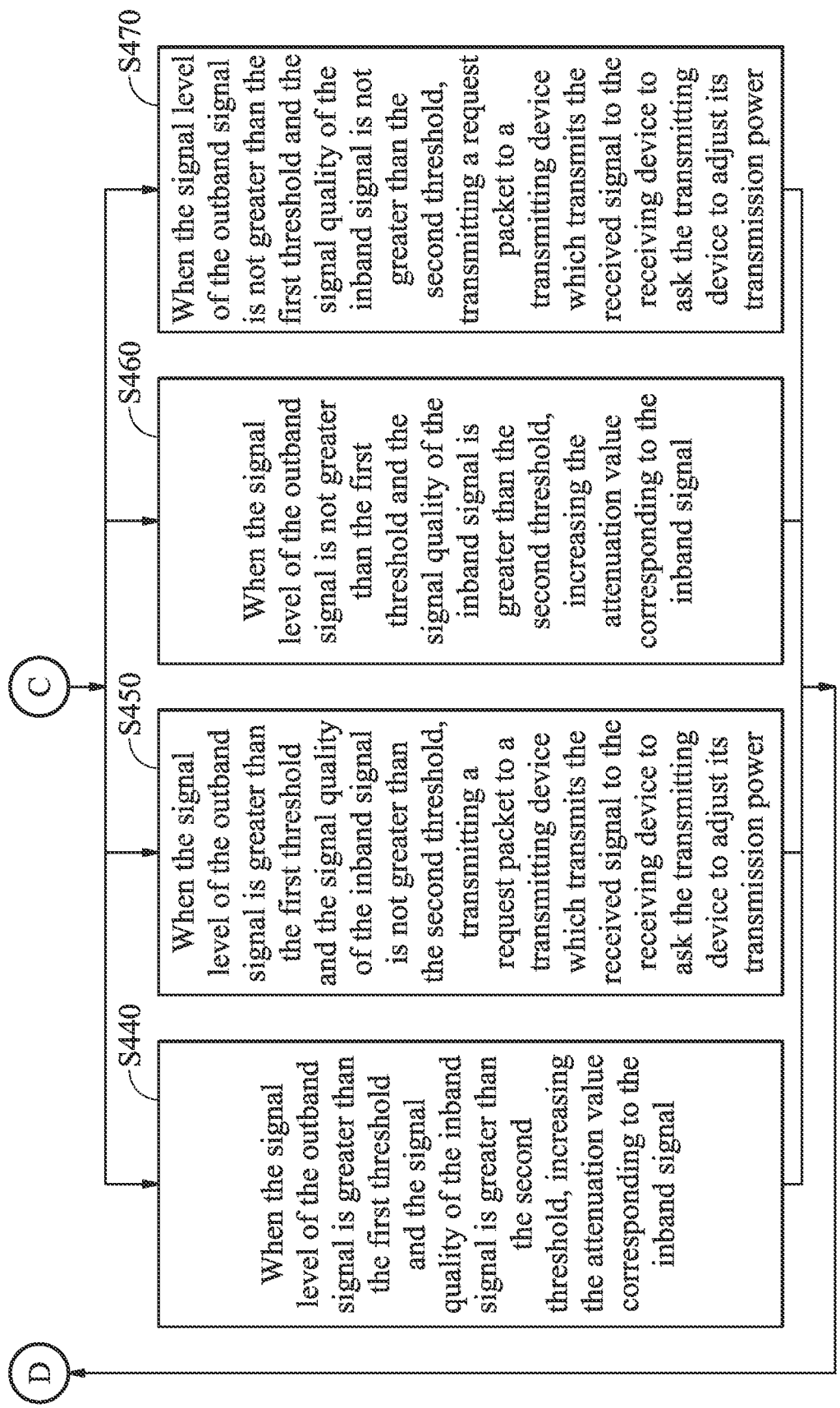

FIG. 4A-4B is a flow chart illustrating step S320 according to another embodiment of the invention. The method shown in FIG. 4A-4B can be applied to the receiving device 100. As shown in FIG. 4A-4B, in step S410, the processor of the receiving device 100 may determine whether the packet error rate of the received signal is lower than a threshold. If the packet error rate of the received signal is lower than the threshold, step S420 is performed.

In step S420, the processor of the receiving device 100 may maintain the attenuation value corresponding to the in-band signal without adjusting the attenuation value corresponding to the in-band signal. If the packet error rate of the received signal is not lower than the threshold, step S430 is performed.

In step S430, the processor of the receiving device 100 may determine whether the signal level of the out-band signal is greater than a first threshold and determine whether the signal quality of the in-band signal is greater than a second threshold.

In step S440, when the signal level of the out-band signal is greater than the first threshold and the signal quality of the in-band signal is greater than the second threshold, the processor of the receiving device 100 may order the adjustable attenuator to increase the attenuation value corresponding to the in-band signal.

In step S450, when the signal level of the out-band signal is greater than the first threshold and the signal quality of the in-band signal is not greater than the second threshold, the processor of the receiving device 100 may order the transceiver of the receiving device 100 to transmit a request packet to a transmitting device which transmits the received signal to the receiving device to ask the transmitting device to adjust its transmission power.

In step S460, when the signal level of the out-band signal is not greater than the first threshold and the signal quality of the in-band signal is greater than the second threshold, the processor of the receiving device 100 may order the adjustable attenuator to increase the attenuation value corresponding to the in-band signal.

In step S470, when the signal level of the out-band signal is not greater than the first threshold and the signal quality of the in-band signal is not greater than the second threshold, the processor of the receiving device 100 may order the transceiver of the receiving device 100 to transmit a request packet to a transmitting device which transmits the received signal to the receiving device to ask the transmitting device to adjust its transmission power.

In the embodiment of FIG. 4A-4B, when the attenuation value corresponding to the in-band signal has been increased or decreased, the flow will back to step S410.

According to the method for dynamically adjusting the attenuation value of the received signal provided in the embodiments of the invention, the receiving device may determine the effect of the out-band signal for the in-band signal and dynamically adjust the attenuation value corresponding to the in-band signal according to the determination result. Therefore, in the method for dynamically adjusting the attenuation value of the received signal provided in the embodiments of the invention, the receiving device may more accurately determine the source of the noise and adjust the attenuation value corresponding to the in-band signal to maintain the stability of the communication quality.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects of the invention. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A receiving device, comprising:
   an antenna device, configured to receive a received signal;
   a filter circuit, configure to separate an in-band signal and an out-band signal from the received signal;
   a transceiver;
   an adjustable attenuator configured to adjust an attenuation value corresponding to the in-band signal and transmit the adjusted in-band signal to the transceiver;
   a circulator, coupled to the antenna device and the filter circuit, wherein the circulator receives the received signal from the antenna device and transmits the received signal to the filter circuit, and wherein the circulator receives a reflected signal from the filter circuit; and
   a processor, coupled to the adjustable attenuator and the transceiver, and according to information related to the out-band signal and information related to the in-band signal which has been processed by the adjustable attenuator and the transceiver, determining how to adjust the attenuation value corresponding to the in-band signal.

2. The receiving device of claim 1, wherein the processor determines whether a signal level of the out-band signal is greater than a first threshold.

3. The receiving device of claim 2, wherein the processor determines whether a signal quality of the in-band signal is greater than a second threshold.

4. The receiving device of claim 3, wherein when the signal level of the out-band signal is greater than the first threshold and the signal quality of the in-band signal is greater than the second threshold, the processor commands the adjustable attenuator to increase the attenuation value.

5. The receiving device of claim 3, wherein when the signal level of the out-band signal is greater than the first threshold and the signal quality of the in-band signal is not greater than the second threshold, the processor commands the adjustable attenuator to decrease the attenuation value, wherein if the attenuation value has been adjusted to a lower limit, the processor commands the transceiver to transmit a request packet to a transmitting device to ask the transmitting device to adjust its transmission power.

6. The receiving device of claim 3, wherein when the signal level of the out-band signal is not greater than the first threshold and the signal quality of the in-band signal is greater than the second threshold, the processor commands the adjustable attenuator to increase the attenuation value.

7. The receiving device of claim 3, wherein when the signal level of the out-band signal is not greater than the first threshold and the signal quality of the in-band signal is not greater than the second threshold, the processor commands the adjustable attenuator to decrease the attenuation value, wherein if the attenuation value has been adjusted to a lower limit value, the processor commands the transceiver to transmit a request packet to a transmitting device to ask the transmitting device to adjust its transmission power.

8. The receiving device of claim 3, wherein when the signal quality of the in-band signal is not greater than the second threshold, the processor commands the transceiver to transmit a request packet to a transmitting device to ask the transmitting device to adjust its transmission power.

9. The receiving device of claim 3, wherein before the processor determines whether the signal level of the out-band signal is greater than the first threshold and whether the signal quality of the in-band signal is greater than the second threshold, the processor determines whether a packet error rate of the received signal is lower than a threshold.

10. The receiving device of claim 1, wherein the filter circuit is a notch filter, wherein the out-band signal is reflected to the circulator from the notch filter and the in-band signal passes through the notch filter.

11. The receiving device of claim 1, wherein the filter circuit is a band-pass filter, wherein the in-band signal is reflected to the circulator from the band-pass filter and the out-band signal passes through the band-pass filter.

12. A method for dynamically adjusting an attenuation value of a received signal, applied to a receiving device, comprising:
    transmitting, by a circulator of the receiving device, the received signal to a filter circuit of the receiving device;
    separating, by the filter circuit, an in-band signal and an out-band signal from the received signal;
    determining, by a processor of the receiving device, how to adjust the attenuation value corresponding to the in-band signal according to information related to the out-band signal and information related to the in-band signal which has been processed by an adjustable attenuator and a transceiver of the receiving device.

13. The method for dynamically adjusting the attenuation value of the received signal of claim 12, further comprising:
    adjusting, by the adjustable attenuator, the attenuation value corresponding to the in-band signal.

14. The method for dynamically adjusting the attenuation value of the received signal of claim 13, further comprising:
    determining, by the processor, whether a signal level of the out-band signal is greater than a first threshold.

15. The method for dynamically adjusting the attenuation value of the received signal of claim 14, further comprising:
    determining, by the processor, whether a signal quality of the in-band signal is greater than a second threshold.

16. The method for dynamically adjusting the attenuation value of the received signal of claim 15, further comprising:
    when the signal level of the out-band signal is greater than the first threshold and the signal quality of the in-band signal is greater than the second threshold, commanding, by the processor, the adjustable attenuator to increase the attenuation value.

17. The method for dynamically adjusting the attenuation value of the received signal of claim 15, further comprising:
    when the signal level of the out-band signal is greater than the first threshold and the signal quality of the in-band signal is not greater than the second threshold, commanding, by the processor, the adjustable attenuator to decrease the attenuation value,
    wherein if the attenuation value has been adjusted to a lower limit value, the processor commands the transceiver to transmit a request packet to a transmitting device to ask the transmitting device to adjust its transmission power.

18. The method for dynamically adjusting the attenuation value of the received signal of claim 15, further comprising:
    when the signal level of the out-band signal is not greater than the first threshold and the signal quality of the in-band signal is greater than the second threshold, commanding, by the processor, the adjustable attenuator to increase the attenuation value.

19. The method for dynamically adjusting the attenuation value of the received signal of claim 15, further comprising:
when the signal level of the out-band signal is not greater than the first threshold and the signal quality of the in-band signal is not greater than the second threshold, commanding, by the processor, the adjustable attenuator to decrease the attenuation value,
wherein if the attenuation value has been adjusted to a lower limit value, the processor commands the transceiver to transmit a request packet to a transmitting device to ask the transmitting device to adjust its transmission power.

20. The method for dynamically adjusting the attenuation value of the received signal of claim 15, further comprising:
when the signal quality of the in-band signal is not greater than the second threshold, commanding, by the processor, the transceiver to transmit a request packet to a transmitting device to ask the transmitting device to adjust its transmission power.

21. The method for dynamically adjusting the attenuation value of the received signal of claim 15, further comprising:
before the processor determines that the signal level of the out-band signal is greater than the first threshold and determines that the signal quality of the in-band signal is greater than the second threshold, determining, by the processor, whether a packet error rate of the received signal is lower than a threshold.

22. The method for dynamically adjusting the attenuation value of the received signal of claim 12, wherein the filter circuit is a notch filter, wherein the out-band signal is reflected to the circulator from the notch filter and the in-band signal passes through the notch filter.

23. The method for dynamically adjusting the attenuation value of the received signal of claim 12, wherein the filter circuit is a band-pass filter, wherein the in-band signal is reflected to the circulator from the band-pass filter and the out-band signal passes through the band-pass filter.

* * * * *